(12) United States Patent
Henrick et al.

(10) Patent No.: US 9,418,521 B1
(45) Date of Patent: Aug. 16, 2016

(54) AGGREGATING RESULTS IN A SLOT GAME

(71) Applicant: KABAM, INC., San Francisco, CA (US)

(72) Inventors: Clive Henrick, Castro Valley, CA (US); Jay Ambrosini, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 81 days.

(21) Appl. No.: 14/069,143

(22) Filed: Oct. 31, 2013

(51) Int. Cl.
    *A63F 9/24*        (2006.01)
    *G07F 17/34*      (2006.01)
    *G07F 17/32*      (2006.01)
    *A63F 13/58*      (2014.01)
    *A63F 13/822*     (2014.01)

(52) U.S. Cl.
CPC ............... *G07F 17/34* (2013.01); *A63F 13/58* (2014.09); *A63F 13/822* (2014.09); *G07F 17/3227* (2013.01); *G07F 17/3244* (2013.01); *G07F 17/3262* (2013.01); *G07F 17/3267* (2013.01); *G07F 17/3269* (2013.01); *G07F 17/3272* (2013.01); *G07F 17/3234* (2013.01)

(58) Field of Classification Search
CPC ..... G07F 17/32; G07F 17/34; G07F 17/3227; G07F 17/3244; G07F 17/3239; G07F 17/3267; G07F 17/3258; G07F 17/3262; G07F 17/3286; G07F 17/3255; A63F 2300/807; A63F 2300/6036; A63F 2300/609
See application file for complete search history.

(56) References Cited

U.S. PATENT DOCUMENTS

| | | |
|---|---|---|
| 5,810,665 A | 9/1998 | Takemoto |
| 7,118,107 B2 | 10/2006 | Niedner |
| 8,202,157 B2 | 6/2012 | Packes, Jr. et al. ............. 463/25 |
| 8,277,312 B2 | 10/2012 | Matthews et al. ............... 463/25 |
| 8,500,546 B2 | 8/2013 | Walker et al. .................... 463/23 |
| 8,590,897 B1 | 11/2013 | McCarey |
| 8,622,821 B1 | 1/2014 | Coronel |
| 2002/0037764 A1 | 3/2002 | Anderson et al. ............... 463/16 |
| 2003/0114219 A1* | 6/2003 | McClintic ........................ 463/25 |
| 2004/0147307 A1 | 7/2004 | Joshi ............................... 463/20 |

(Continued)

FOREIGN PATENT DOCUMENTS

KR      20150000002 A      1/2015

OTHER PUBLICATIONS

"You Can Soon Play Avatar Video Slot Machines", printed from http://www.comingsoon.net/news/movienews.php?id=109114, dated Sep. 18, 2013, 3 pages.

(Continued)

*Primary Examiner* — Justin Myhr
(74) *Attorney, Agent, or Firm* — Sheppard Mullin Richter & Hampton LLP

(57) ABSTRACT

A system and method for aggregating results in a slot game are disclosed. In a given pull outcome of the slot game, multiple results may be determined. An order or orders for aggregating the results in the given pull outcome may be obtained. In some examples, the obtained order(s) may specify temporal sequence for applying different types of results in the given pull outcome. In some examples, the order(s) may be based on the player character(s). In some examples, the order(s) may be based on a difficulty level selected by the player. In some examples, such orders may be for purchase for selection by the players. In some implementations, the results in the pull outcome may include gameplays for implementation in a game space associated with the slot game. In those implementations, the implementation of those gameplays may be in accordance with the obtained order(s).

18 Claims, 7 Drawing Sheets

(56) References Cited

U.S. PATENT DOCUMENTS

| | | | |
|---|---|---|---|
| 2006/0040720 A1 | 2/2006 | Harrison | |
| 2006/0252517 A1* | 11/2006 | Walker | G07F 17/32 463/25 |
| 2007/0167239 A1 | 7/2007 | ORourke | |
| 2007/0259713 A1* | 11/2007 | Fiden et al. | 463/25 |
| 2007/0281775 A1 | 12/2007 | Kashima | |
| 2007/0298856 A1 | 12/2007 | Gilmore et al. | 463/16 |
| 2009/0153567 A1 | 6/2009 | Jung | |
| 2010/0056261 A1 | 3/2010 | Englman | |
| 2010/0203948 A1 | 8/2010 | Falciglia, Sr. | 463/20 |
| 2010/0240436 A1* | 9/2010 | Wilson | G07F 17/3267 463/20 |
| 2011/0039609 A1 | 2/2011 | Agam | |
| 2011/0244935 A1 | 10/2011 | Matthews et al. | 463/9 |
| 2012/0115593 A1 | 5/2012 | Vann | |
| 2012/0135797 A1 | 5/2012 | Muir | 463/20 |
| 2012/0196667 A1 | 8/2012 | Walker et al. | 463/16 |
| 2014/0309002 A1 | 10/2014 | OGorman | |
| 2015/0141127 A1 | 5/2015 | Arnone | |
| 2015/0235513 A1 | 8/2015 | Arnone | |

OTHER PUBLICATIONS

"Slots of fun!", printed from URL http://www.gamezebo.com/games/zynga-slots/review, printed on Sep. 24, 2013, 2 pages.

Marshall Fey, Slot Machines: A Pictorial History of the First 100 Years, 1983, Liberty Belle Press, 5th Edition, p. 167.

* cited by examiner

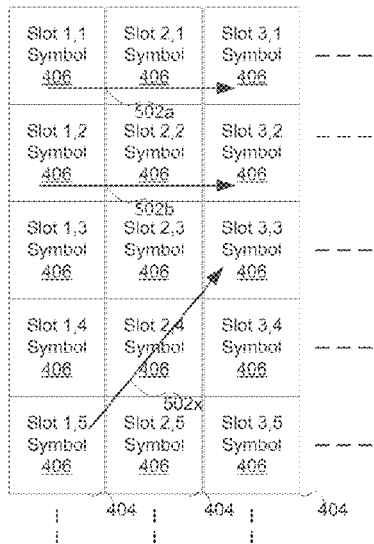
FIG. 5
Result 1 602 (e.g., from payline 502a): 100 Coins x PC's lock picking skill level x PC's level)
Result 2 602 (e.g., from payline 502b): 200 lock picking points
Result X 602 (e.g., from payline 502x): 500 XP points
FIG. 6
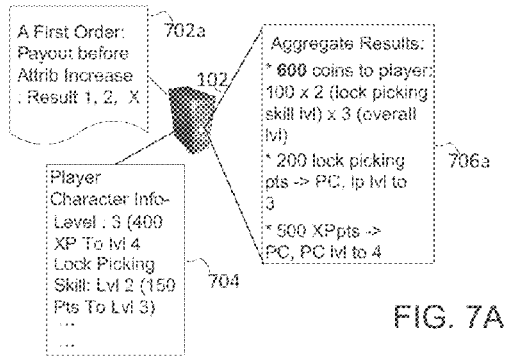
FIG. 7A
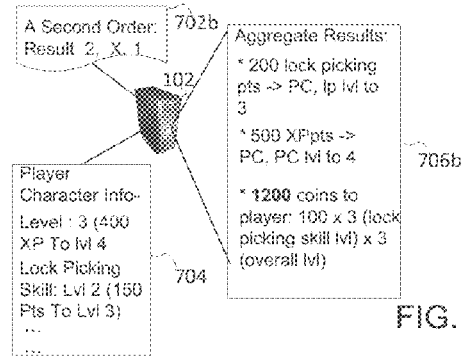
FIG. 7B

AGGREGATING RESULTS IN A SLOT GAME

FIELD OF THE DISCLOSURE

This disclosure relates to a slot style game in which a pull outcome may comprise multiple results.

BACKGROUND

Video slot games are known. In those games, a number of virtual reels are typically presented side by side in an interface simulating a physical slot machine. Each virtual reel in those games typically includes a number of virtual slots associated with various symbols. The virtual reels may be "rotated" by the players of those games through the interface. The symbols shown in the positions on the reels visible at the end of a turn, or "pull," may be referred to as the "pull outcome." Winning symbols, e.g., matching symbols are typically assessed across multiple paylines on the virtual reels in those games. The winning symbols typically result in a player winning an amount of compensation, i.e., a payout (typically real-world money and/or credits). A pull outcome in those games may comprise multiple winning symbols resulting in separate payouts. Those games typically aggregate such separate payouts in the pull outcome into a combined payout for distribution to the player.

SUMMARY

One aspect of the disclosure relates to aggregating multiple results in a pull outcome of a slot game. The multiple results in the pull outcome may include, but not limited to, one or more attribute changes to one or more player characters associated with a player, payouts distributed to the player, gameplays to be implemented in a game space associated with the slot game, and/or any other types of results. For aggregating such results in the pull outcome, an order or orders may be obtained and the results may be aggregated by applying the obtained order(s). For example, the obtained order(s) may specify a temporal sequence for aggregating different types of the results in the pull outcome. In some examples, such an order or orders may be based on a difficulty level selected by the player. For example, the results in the pull outcome may be more rewardingly aggregated by applying the types of results that will affect application of payout type of results in the pull outcome before applying the payout type of results. In some examples, the order(s) may be based on the player character(s) associated with the player. For example, individual player characters and/or configurations of play characters (e.g., configurations of a "party") may correspond to certain orders for aggregating the results in the pull outcome. In some examples, some orders may be for purchase for selection by the players. For example, one or more orders for aggregating the results more rewardingly may be offered for purchase by the players. This may provide players an enhanced slot game experience that is different from the conventional slot game described above. This may enhance monetization opportunity for the provider(s) of the slot game.

A system configured for aggregating results in a slot game may include a server. The server may operate in a client/server architecture with one or more client computing platforms. The client computing platforms may be associated with the users of the game space. The server may be configured to execute one or more of a player character module, a slot game module, a result module, an order module, an aggregate result module, a game space module, and/or other modules.

The player character module may be configured to manage player character information. The player character information managed by the player character module may reflect various aspects about player characters in the game space. For example, the player character information managed by the player character module may include information regarding a race associated with a given player character, e.g., such as human, dwarves, elves, halflings, or any other race; may include information regarding a class associated with the given player character, e.g., such as mage, fighter, thief and any other player character class; may include information regarding a level associated with the given player character; may include information regarding abilities associated with the given player character; may include information regarding skills associated with the given player character; may include information regarding an inventory of one or more virtual items associated with in the given player character; and/or any other play character information.

The slot game module may be configured to simulate, through a slot game interface, a slot game for participation by the players and to generate, for the players, pull outcomes of the slot game. The slot game simulated by the slot game may present in the slot game interface a configuration of symbols appearing on virtual reels, i.e., a pull outcome after a pull by a player. Such a configuration of symbols in a given pull outcome may be evaluated; and winning combinations of symbols may be determined according to active paylines associated with the player. In some implementations, the slot game simulated by the slot game module may be associated with a game space executed and implemented by the game space module, for example via game plots, stories, and/or any other types of narratives.

The result module may be configured to determine, for the players, results of the slot game based on the pull outcomes generated by the slot game simulated by the slot game module. The results determined by the result module may include various types, such as, without limitation, attribute change type of results wherein the results may effectuate modification one or more attributes of one or more player characters, payout type of results wherein the results may effectuate distribution of payouts to the player, slot game adjustment type of results wherein the result may trigger various aspect adjustment of the slot game such as, but not limited to, modification of the modifier, increasing the number of active paylines, improvements to odds (real or perceived) and/or any other types of slot game aspect adjustment, bonus game type of results wherein the results may trigger one or more bonus games, free pulls, a jackpot won, and/or any other bonuses for the player, gameplay type of results wherein the results may determine specific gameplays to be implemented in a game space associated with the slot game and/or outcomes of such gameplays (e.g., damage incurred or received, movements triggered, objects collected and/or any other outcomes), and/or any other types of results in a pull outcome. In some implementations, the result module may determine such results by identifying winning combinations of symbols and evaluating the symbols across various lines, i.e., paylines on virtual reels associated with the slot game. In certain situations, the result module may determine more than one results achieved by a player in a pull outcome.

The order module may be configured to obtain orders for applying results in a given pull outcome. The orders obtained by the order module may specify temporal sequences by which the results in the given pull outcome may be applied. As such, the orders obtained by the order module may dictate timing by which the results in the given pull outcome may be applied.

In some implementations, the orders obtained by the order module may be deterministic or quasi-deterministic such that they may be criteria based. Some examples of such criteria may include, without limitation, a level, class, race, one or more skills, one or more abilities, one or more items and/or any other aspects associated with one or more player characters; a condition in the slot game—e.g., achieving a winning combination of symbols to trigger a different order for applying the results for 5 slot turns; for every milestone amount of experience points achieved in the slot game, a new and different order for applying the results in a pull outcome may triggered; for every milestone amounts of virtual currencies or credits accumulated in the player account, a new and different order for applying the results may be triggered, and/or any other conditions; a state of the game space—e.g., to freeze a monster for a number of turns and during those turns, a different order for applying the results in the pull outcome may be used; for every milestone number of monsters killed in the game space, a new and different order for applying the results may be trigged; for every stage entered in the game space, a new and different order for applying the result may be trigged; breaking into a building to trigger a different order and/or any other game state; and/or any other criteria.

In some implementations, the order module may be configured to obtain the orders for applying results in a pull outcome from a given player, e.g., via a graphical interface. In those implementations, the given player may be enabled to directly select specific order or orders for applying the results in a pull outcome; may be enabled to select one or more aspects of the slot game and/or the game space that may dictate the order(s) for applying results in a given pull outcome; and/or may be enabled to manipulate the orders for applying the results in the pull outcome in any other ways. In some examples, the order(s) for applying the results may be for purchase by the player such that the player may spend virtual consideration (e.g., virtual currencies, real-world money, credits and/or any other values associated with the game space) to select an order for applying the results in a given pull outcome. In some examples, the orders obtained by the order module for a given player may be based on player character(s) or a configuration of the player characters—e.g., a configuration a "party" of player characters.

The aggregate result module may be configured to aggregate the results determined by the result module by applying the orders obtained by the order module. The result aggregation by the aggregate result module may involve applying individual results in a pull outcome in the time sequence specified in accordance with an order or orders obtained by the order module. In some implementations, the order(s) obtained by the order module may specify a temporal sequence for applying different types of results in the pull outcome. For example, the order(s) obtained by the order module may specify may specify any payout type of results should be applied before any attribute increase type of results.

In some implementations, the server may include a game space module configured to apply the slot game results determined by the result module based on the orders obtained by the order module for implementing instances of a game space associated with the slot game. For example, a given result in a given pull outcome may comprise a combination of symbols, which may represent various game space elements, game actions, virtual objects, values and/or any other components associated with the game space. Such a result in the given pull outcome may trigger implementation of one or more gameplays in connection with the winning combination of symbols. In some examples, a given pull outcome may comprise multiple such a result that may trigger corresponding gameplays to be implemented in the game space. In those examples, the game space module may be configured to implement those gameplays in accordance with orders obtained by the order module and/or the aggregation of results determined by the aggregate result module.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates one example of multiple paylines in a pull outcome of the slot game shown in FIG. 4.

FIG. 6 illustrates one example of multiple results in a pull outcome of the slot game shown in FIG. 4.

FIG. 7A illustrates one example of aggregating results shown in FIG. 6 by applying a first order.

FIG. 7B illustrates one example of aggregating the results shown in FIG. 6 by applying a second order.

DETAILED DESCRIPTION

Figure 1:
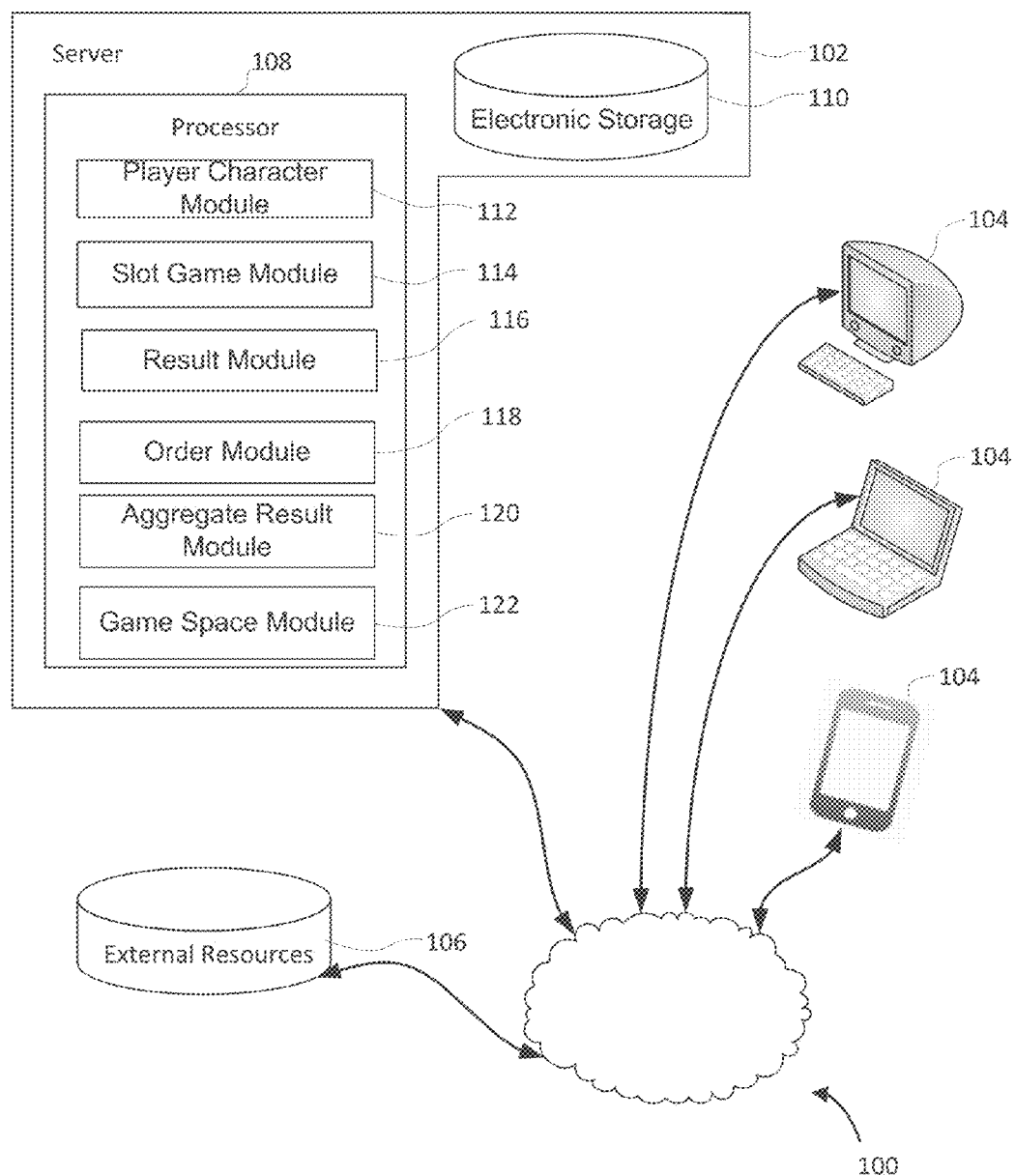
FIG. 1 illustrates a system for aggregating results in a slot game in accordance with the disclosure.

FIG. 1 illustrates a system 100 for aggregating results in a slot game. Providing the game space/environment may include hosting the game space/environment over a network. Providing the game space may include hosting the game space over a network. The users may access system 100 and/or the game space via client computing platforms 104.

In some implementations, system 100 may include a server 102. The server 102 may be configured to communicate with one or more client computing platforms 104 according to a client/server architecture. The users may access system 100 and/or the game space via client computing platforms 104. The computer program modules may include one or more of a player character information module 112, slot game module 114, payline module 116, game space module 122 and/or other modules.

The player character module 112 may be configured to manage information regarding play characters associated with players of a slot game. The player character information managed by the player character module 112 may reflect various aspects about such player characters including, without limitation, levels, abilities, skills, inventory, deity, health, attack, defense, sense, magic spells, language, movement, speed, and/or any other attributes associated with the player characters, and/or any other aspects about the player characters. In some implementations, these aspects about the player characters may contribute to holistic representations of the player characters in a game space associated with the slot game. Such a game space may be executed and implemented by the game space module 122 and will be described in further details in connection with the game space module 122. It should be appreciated that the player character information managed by the player character module 112 may be however specified by the provider, administrator, moderator, and/or any other entities related to the game space. For example, in some implementations, the player character information managed by the player character module 112 may reflect a limited number of aspects about the player characters for simplicity (e.g., hit points, defense and attack); while in some other implementations, the player character information managed by the player character module 112 may reflect a number of expanded aspects of the player characters. (e.g., sub-aspects such as attack power, range, level, speed and other sub-aspects may be further established under a general attack aspect about a player character).

The player character information regarding a given player character as managed by the player character module 112 may include a name, a description and/or any other identification information regarding the given character. In some implementations, the player character identification information may be determined by the provider, administrator, moderator, and/or any other entities related to the game space. In some implementations, the player character identification information may be determined by the players, for example via the interface 200 shown in FIG. 2.

The player character information regarding a given player character as managed by the player character module 112 may include information regarding a race associated with the given player character, e.g., such as human, dwarves, elves, halflings, or any other race. In some implementations, the player character race information may be determined by the provider, administrator, moderator, and/or any other entities related to the game space. The race associated with the given player may affect various characteristics of the given character. For example, a player character belonging to a human race may manifest characteristics of being adaptable, flexible, and ambitious as compared to other races in the game space; and a player character belonging to a dwarf race may manifest characteristics of being steadfast, speedy, tenacious and brave as compared with other races in the game space.

The player character information regarding a given player character as managed by the player character module 112 may include information regarding a class associated with the given player character, which may indicate a function of the given player character. The class associated with the given player character may affect other aspects associated with the given player character. For example, the class associated with the given player character may give extra abilities, skills, items and/or any other elements. For instance, fighter and paladin may be two different classes; a given player character associated with a fighter class may be given extra aspects as a striker to his repertoire (e.g., extra attack skills, attack power, magic spell cast abilities, and/or any other aspects); and a given player character associated with a paladin class may be given extra abilities often associated with leaders, such as healing. Some examples of typical classes that may be associated with the given player may include, but not limited to, merchant, fighter, mage, thief, cleric, wizard, warlord, rouge, ranger, warlock and any other classes. In some exemplary implementations, the class associated with the given character may define a role the given player plays in adventures in the game space associated with the slot game, for example such as the game space executed and implemented by game space module 122. In some implementations, the player character class information may be determined by the provider, administrator, moderator, and/or any other entities related to the slot game. In some implementations, the player character class information may be determined by the players of the slot game.

The player character information regarding a given player character as managed by the player character module 112 may include information regarding a level associated with the given player character. Such level information about the given player character may reflect relative experiences of the player in the slot game, relative adventure experiences by the given player in the game space, and/or any other states associated with the player or the player characters. With each new level the given player character attains, the player character becomes more experienced, which may be reflected by enhancements in various characteristics associated with the given player character. In some exemplary implementations, the level associated with the given player character may be manifested via numerical number(s) expressed as experience points ("XP'). In some implementations where the game space is associated with the slot game, the given character may earn XPs by, for example, without limitation, defeating monsters, completing skill challenges, collect virtual items, amass virtual currencies, items, resources, objects, real-world money, credits and/or any other values associated with the game space, and/or other gameplays. Typically, when a number of XPs of the given player character reaches a milestone, the given player character may attain a new level. For example, as an illustration, between 0-1,000 XP, the given player character may be associated with level 0 within the game space; between 1,000-2,500 XP, the given player character may be associated with level 1 within the game space; between 2,500-5,000 XP, the given player character may be associated with level 2 within the game space; and so on.

The player character information regarding a given player character as managed by the player character module 112 may include information regarding abilities associated with the given player character. Some common examples of abilities associated with the given player character may include strength, dexterity, constitution, intelligence, wisdom, charisma, perception, diplomacy, negotiation, and/or any other abilities. Typically, the abilities associated with the given player character may be represented by numeric score, reflecting quality of these abilities by the given player character. For example, the given player character may be associated with an ability score of 18 (out of 20) in strength, which may mean the given character has excellent strength. On the other hand, the given character may be associated with an ability score of 5 (out of 20) in wisdom, which means the given character has poor intelligence. Typically, as the given player character progress through adventures in the game space, the ability scores associated with the given player character may increase or decrease along with the level associated with the player character; and the given player character may acquire new abilities when reaching certain milestones in the game space.

The player character information regarding a given player character as managed by the player character module 112 may include information regarding basic attributes associated with the given player character, such as speed, stamina, hit points, and/or any other basic attributes reflecting various aspects about the given player character. For example, a number of hit points may be associated with the given player character reflecting how much damage the given player character may withstand from attack; a number of stamina points may be associated with the given player reflecting how much energy the given player character may expand for actions; and so on.

The player character information regarding a given player character as managed by the player character module 112 may include information regarding skills associated with the given player character, which may represent training, education and/or any other learned aspects of the given player character. In some examples, the skill(s) associated with the given player character may provide capabilities extra to those inherent in the class and/or race associated with the given player character. In those implementations where the game space is associated with the slot game, skills may be acquired or learned by the given player character during adventures in the game space by the given player character. For example, the given player character may collect a scroll to learn a specific skill (e.g., lock-picking) during an adventure in the game space by defeating a monster. In some implementations, ranks, levels, and/or any other classification systems may be established for a given category of a skill. For example, a climb skill in the game space may have 10 levels such that gaining each new level of the climb skill gives a player character extra climb capabilities in the game space. In another example, a lock-picking skill may have 5 levels, and within each level there are ranks such that each new level and rank combination gives the player character capabilities to open different kinds of locks in the game space. The player character typically starts out in the game space with a set of skills, which in some examples are determined based on the class, race and/or any other criterias associated with the player character. As the player character progress in the game space through adventures, the player character may also progress along levels and ranks in existing skills, learn new skills, and/or otherwise progress along skill trees provided in the game space.

In some implementations, the progress of a given player character on a skill tree may be limited based on level, experience points, and/or any other attributes associated with the given player character. For example, a level 1 fighter may acquire up to level 4 in Climb, up to level 2 in Jump, and up to level 1 in Spot; a level 2 fighter may acquire up to level 8 in Climb, up to level 5 in Jump, and up to level 2 in Spot; a level 4 cleric may acquire up to level 2 in Climb, up to level 2 in Jump, and up to level 1 in Spot; and so on. Typically, the higher level the given player character is, the more skills and the higher levels of the skills may be acquired by the given player character and thus may be called upon during adventures (e.g., encounters with monsters) in the game space. In some examples, the effectiveness of the skills acquired by the given player character may correlate with abilities associated with the given player character. For example, if the given player character is good at dexterity as reflected by the dexterity score associated with the given player character, the given player character may be more effective in applying his lock picking skill in certain adventures.

The player character information regarding a given player character as managed by the player character module 112 may include information regarding an inventory of one or more virtual items associated with in the given player character. For example, the given player character may carry virtual items such as, without limitation, sword, armor, glove, healing potion, and/or any other virtual items. For such gear carried by the given player character, body slots may be assigned to correspond various body parts of the given player character. In some examples, the given player character may be associated with an inventory of virtual items that have been acquired by the given player character in the game space through adventures. The inventory associated with the given player character may have a dimensionality such that virtual items in the inventory may take different amounts of space to reflect dimensions of these virtual items. Virtual items that are collected by the player, for example via defeating monsters, looting buildings, and/or in any other ways may be stored in the inventory and may be accessed by the player. In some implementations, a given player character may be associated with a number of body slots such that the player may assign one or more items in the inventory to various equipment slots of the given player character. In this way, the virtual items assigned to the equipment slots associated with the given player character become gears carried around by the given player character in the game space for adventures.

Figure 2:
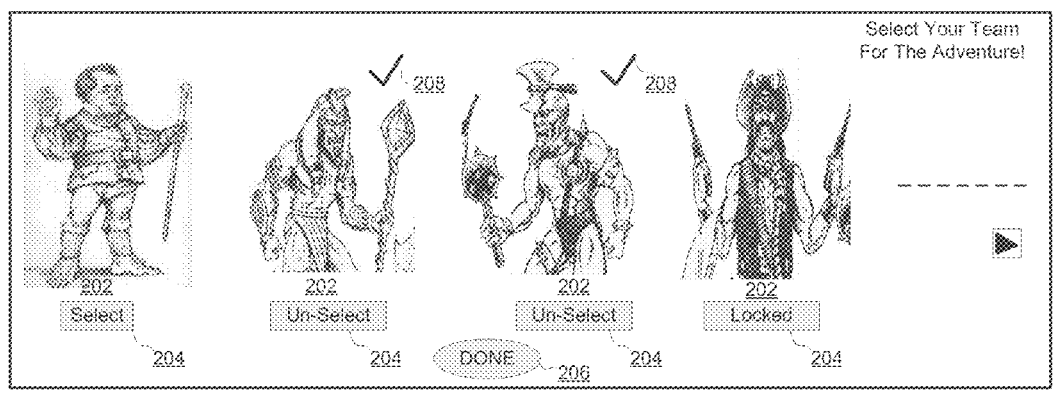
FIG. 2 illustrates one example of facilitating a player of the slot game to select player characters using the system shown in FIG. 1.

FIG. 2 illustrates one example of facilitating a player of the slot game to select player characters using system 100 shown in FIG. 1. As shown in this example, a player selection interface 200 may be provided by the system 100, for example on client computing platforms 104 to enable the player to select one or more player characters to be associated with that player in the slot game that will be described in further details in FIGS. 4-7. As illustrated in FIG. 2, the interface 200 may include graphics representing player characters 202 that may be selected by players. Field controls 204 such as select buttons shown in this example may be provided in the interface 200 to enable the players to select individual player characters to be associated with the players. As also shown, indicators 208 may be presented in the interface 200 to indicate that the selected player characters. As still shown in this example, one or more player characters may not be available for selection by the player at a given point of time; and may be presented as locked characters in the interface 200. Such locked characters may become unlocked as the players reach certain milestones (e.g., reach certain XP levels, accumulated certain amount of coins and/or any other milestones). As shown, a button 206 may be provided in the interface 200 to enable the players to finish selecting the player characters.

Figure 3:
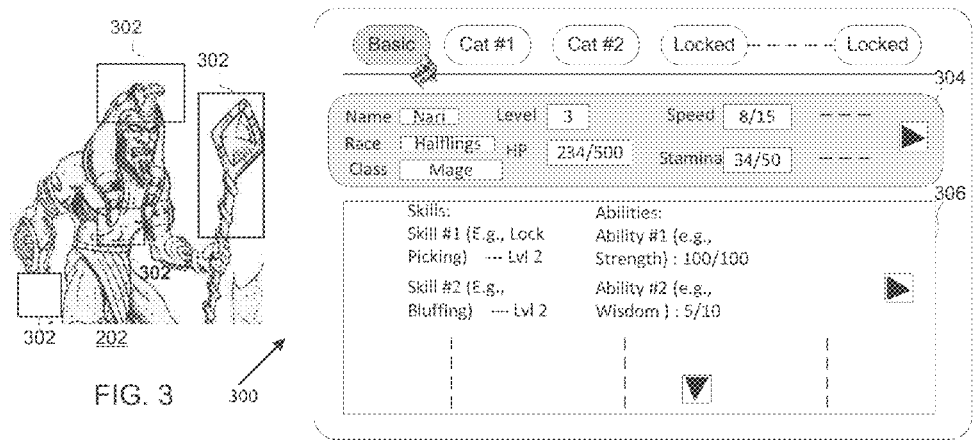
FIG. 3 illustrates one example of a player character shown in FIG. 2.

FIG. 3 illustrates one example of a player character shown in FIG. 2. It will be described with references to FIG. 2. As shown, the player character 202b as shown in FIG. 2 may have equipment slots 302 on the player character 202's body. Virtual items may be assigned by players to the equipment slots 302 such that the assigned virtual items become equipment carried around by the player character 202 in the game space. As illustrated in FIG. 2, the player character 202b in this example is associated with an equipment slot in his left hand and a magic staff is assigned to that equipment slot such that the player character carries the magic staff in the game space; and is associated with a magic hat in head slot 302 and a magic headband is assigned to that slot such that the player character 202 wears the headband when moves around in the game space. Also illustrated in this example is that the equipment slots 302 (such as belt, right hand as shown in this example) may be empty without any virtual items are assigned to them.

Also shown in FIG. 3 is a player character information interface 300 presenting various player character information regarding the player character 202. As shown, a basic information pane 304 may be presented in the player character interface 300 for presenting basic attributes associated with the player character 202 as illustrated in FIG. 3. Also illustrated in this example is a detail player character information pane 306 for presenting various skills, abilities and/or any other characteristics associated with the player character 202.

Returning to FIG. 1, the slot game module 114 may be configured to simulate, through a slot game interface, a slot game for participation by the players and to generate, for the players, pull outcomes of the slot game. Through the slot game simulated by the slot game module 114, the players may be facilitated to effectuate a rotation of virtual reels simultaneously or near simultaneously to achieve one or more combinations of matching symbols in pull outcomes. The rotation of the virtual reels (i.e., a pull) may be effectuated by the players through various slot plays including, but not limited to, pressing a virtual pull button, placing various bets (e.g., incremental bet, max bet), selecting a multiplier, and/or any other slot play actions. After a given pull by a player, the virtual reels may stop at a configuration stochastically or quasi-stochastically representing a pull outcome such that symbols may statically appear on virtual slots of the visible portion of virtual reels.

The slot game module 114 may be configured to evaluate symbols in a given pull outcome and determined winning combinations of the symbols based on active paylines associated with a player. The active paylines associated with the player may be obtained and/or determined by the payline module 116, which will be described in further details in connection with FIGS. 5-7. In some examples, the player may be associated with two active paylines intersecting each other such that the two active paylines share one or more symbols in common. In those examples, the slot game module 114 may be configured to determine that such symbols in common as winning symbol(s).

In some implementations, the slot game simulated by the slot game module 114 may be associated with a game space executed and implemented by the game space module 122, for example via game plots, stories, and/or any other types of narratives. The symbols associated with the slot games simulated by the slot game module 114 may represent various game space elements, such as, without limitation, non-player characters including monsters, creatures, enemy or friendly combatants, and/or any other non-player characters, buildings, virtual items, virtual containers, treasures, objects, and/ or any other game space elements. As described herein, the game space elements represented by the symbols associated with the slot game may be associated with attributes reflecting various characteristics of these game space elements in the game space.

Figure 4:
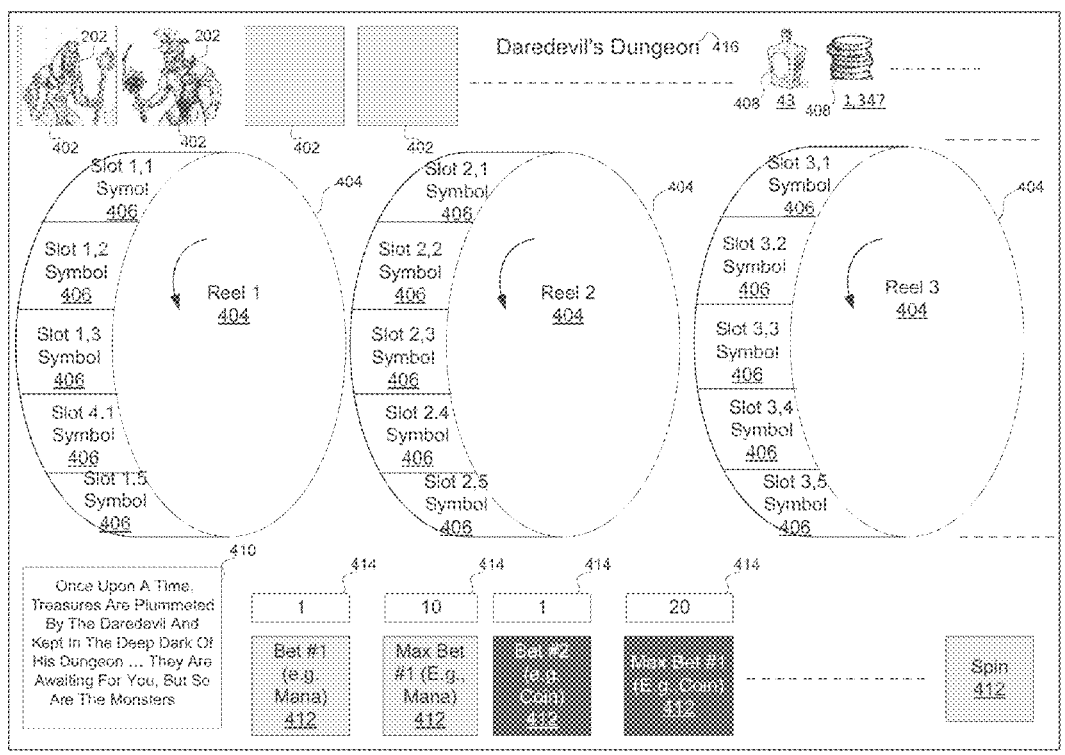
FIG. 4 illustrates one example of a slot game interface for simulating a slot game in accordance with the disclosure.

FIG. 4 illustrates one example of a slot game interface for simulating a slot game in accordance with the disclosure. As shown in this example, the slot game interface may be implemented to facilitate players to participate in slot games. As illustrated, the slot game interface 400 may include one or more player character slots 402 indicating player characters associate with players of the slot game facilitated by the slot game interface 400. As described in FIG. 2, in some implementations, the player characters 202 appearing in player character slots 402 may be selected by players through an interface 200. It should be appreciated that although four player character slots 402 are shown in this example, this is not intended to be limiting. In some other examples, the number of player character slots 402 may be more or less than four.

In any case, as illustrated, the slot game interface 400 may include one or more virtual reels, such as virtual reels 404 shown in this example. Visual effects of the virtual reels 404 being rotated may be simulated and presented through the slot game interface 400. As shown, a given virtual reel 404 may comprise virtual slots 406. As shown, a number of virtual slots 406 on the virtual reels 404 may be presented in the slot game interface 400 statically to simulate the visual effect that the virtual reels 404 are stopped at a configuration stochastically or quasi-stochastically as a pull outcome. Also shown in this example is that individual virtual slots 406 may be associated with symbols such that the symbols may be shown in the virtual slots 406 on the visible portion of virtual reels 404 at the end of a turn. It should be appreciated the number of virtual reels and the number of virtual slots on an individual virtual reel are illustrated merely as a non-limiting example. In some other examples, such numbers may be more or less than those illustrated in FIG. 4.

As shown in this example, the slot game interface 400 may include one or more buttons 410 to enable the players to place various bets including, without limitation, virtual values, items, credits, real-world money, and/or any other type of bets to affect outcome of the slot game facilitated by the slot game interface 400. The bets placed by the players as facilitated by the slot game interface 400 may affect various aspects of an outcome of the slot game, for example such as, but not limited to, a value of one or more multipliers, symbols that may be played (e.g., symbols representing exciting game space elements, wild, scatter), a number of bonus games that may be played, and/or any other aspects of the slot game. As illustrated, in this example, the bets include virtual items such as mana, virtual currencies such as coins, and other type of bets (not shown in this example for clarity). As shown, indicators 414 may be presented in the slot game interface 400 to indicate amounts of bets a player has placed in the slot game. As also shown, the indicators 418 may be presented in the slot game interface to display balances of bet-able objects in player accounts associated with players. In some implementation, the slot game interface 400 may facilitate players to purchase additional bet-able objects, e.g., via a store interface.

Also shown in FIG. 4 is a story window 410 presenting a narrative regarding a game space associated with the slot game facilitated by the slot game interface 400. As shown, the story window 410 may present narrative information indicating a location in the game space associated with the slot game. In this example, the slot game is associated with a dungeon in the game space with monsters and treasures in the dungeon. As also shown, the location of the game space environment associated with the slot game may be indicated in the slot game interface through title 416. It should be understood, although in this example the narrative information about the game space is illustrated as texts, this is not intended to be limiting. In some other examples, such narrative information about the game space may be presented with audio and/or video effects, such as, but not limited to, animation, 3D graphics, surround sound, interactive voice, and/or any other audio/video effects.

Returning to FIG. 1, the result module 116 may be configured to determine, for the players, results of the slot game based on the pull outcomes generated by the slot game simulated by the slot game module 114. For determining results of the slot game, the result module 116 may evaluate symbols in a given pull outcome and identify winning combinations of symbols appearing in the given pull outcome. The results determined by the result module 116 may include various types, such as, without limitation, attribute change type of results wherein the results may effectuate modification one or more attributes of one or more player characters, payout type of results wherein the results may effectuate distribution of payouts to the player, slot game adjustment type of results wherein the result may trigger various aspect adjustment of the slot game such as, but not limited to, modification of the modifier, increasing the number of active paylines, improvements to odds (real or perceived) and/or any other types of slot game aspect adjustment, bonus game type of results wherein the results may trigger one or more bonus games, free pulls, a jackpot won, and/or any other bonuses, gameplay type of results wherein the results may determine specific gameplays to be implemented in a game space associated with the slot game and/or outcomes of such gameplays (e.g., damage incurred or received, movements triggered, objects collected and/or any other outcomes), and/or any other types of results in a pull outcome. For example, a winning combination of symbols in the pull outcome may represent an attribute boost to a specific attribute associated with the player character(s). For instance, a combination of symbols graphically depicting power signs may represent an amount of attack power boost, e.g., 100 points boost to the attack power of a given player character associated with the player for 5 slot turns. In another example, some winning combinations of symbols in the pull outcome may represent game space elements in a game space associated with the slot game. In that example, one or more gameplays may be triggered to be implemented in the game space as the result of the player achieving such winning combinations of symbols. Further details about the implementation of such winning combinations of symbols and the game space will be described in connection with the game space module 122.

In some implementations, the result module 116 may identify the winning combinations of symbols by evaluating the symbols across various lines, i.e., paylines on the virtual reels. As used herein, a payline may include a line that connects at least two virtual slots on one or more virtual reels, such as the virtual slots 406 on virtual reels shown in FIG. 4. In some implementations, the payline may specify a direction in which symbols on the payline may be evaluated, for example, without limitation, left to right, right to left, top to down and/or any other directions. In some implementations, for determining which result(s) may be awarded according to the winning combinations of the symbols on the payline, the result module 116 may consult a payline table, which may specify associations between the winning combinations of symbols appearing on the payline and corresponding results. For example, the payline table may specify that a given payline is associated with X number of specific winning combinations that may be formed by the symbols appearing on the given payline; and the individual combinations of the winning symbols correspond to one or more results.

In certain situations, the result module 116 may identify more than one winning combinations of symbols achieved by a player on the given payline in the pull outcome. In some implementations, the result module 116 may be configured to select one result from the multiple results achieved by the player on the given payline for one or more awards: for example, the result module 116 may select the best two results (e.g., the biggest payout, the biggest increase of player character attribute) to be awarded to the player.

FIGS. 5-6 illustrate, in a given pull outcome, multiple results on multiple paylines may be determined by the result module 116. FIG. 5 illustrates one example of multiple paylines in a pull outcome of the slot game shown in FIG. 4. It will be described with references to FIG. 4. As shown, paylines 502 may connect virtual slots 406 of the virtual reels 404. Along the paylines 502, symbols appearing on the virtual slots 406 at the end of a pull may be evaluated for identifying winning combinations of symbols. As shown, a given payline 502 may specify a direction by which the symbols on the given payline may be evaluated. It should be appreciated that although only three paylines 502, i.e., 502a,b,x are shown in FIG. 5, this is merely illustrative. It should be understood that in other examples, the number of paylines may be associated with the slot game may be more or less than 3.

FIG. 6 illustrates one example of multiple results in a pull outcome of the slot game shown in FIG. 4. It will be described with references to FIGS. 4-5. As shown, results 602 corresponding to individual paylines in the slot game, such as the paylines shown in FIG. 5 may be determined by the server 102, e.g., via the result module 116. As illustrated, the individual payline 502 may have a corresponding result 602 providing an award to a player of the slot game. As shown, the multiple awards may include an amount of payouts (e.g., coins) to the player, such as result #1 shown in FIG. 6. As illustrated, the application of result #1 may depend on application of other results in the pull outcome, e.g., such as the result #2 and #X shown in this example. As illustrated, such a dependency may be effectuated by server 102 by including results #2 and #X in the application of result #1, e.g., through a formula as shown. In this example, the application of result #1, e.g., determination of an amount of coins to be distributed to the player may depend on a skill associated with a player character, a level of the player character and/or any other criteria. As shown, result #2 corresponds to payline 502b in this example, and awards 200 lock picking skill points, which may affect (e.g., increase) the lock picking skill level of the player character as will be described in further details in FIGS. 7A-B. As also shown, result #x corresponds to payline 502x in this example, and awards 500 XP points to the player character, which may improve the level of the player character.

Returning to FIG. 1, the order module 118 may be configured to obtain orders for applying results in a given pull outcome. The orders obtained by the order module 118 may specify temporal sequences by which the results in the given pull outcome may be applied. As such, the orders obtained by the order module 118 may dictate a timing by which the results in the given pull outcome may be applied. In some implementations, the orders obtained by the order module 118 may specify temporal sequence for applying different types of individual results in the given pull outcome. By way of a non-limiting example, in those implementations, a given order obtained by the order module may specify that the attribute adjustment type of results in a pull outcome should be applied before payout type of results in the pull outcome; gameplay type of results should be applied before the attribute adjustment type of results; slot game adjustment type of results (e.g., changing the modifier) should be applied before the payout type of results; and so on.

In some implementations, the orders obtained by the order module 118 may be deterministic or quasi-deterministic such that they may be criteria based. That is, in those implementations, whenever the same criteria is present in the slot game, game space, and/or externally, the same or substantially same orders of applying results in the pull outcome may be obtained by the order module 118. For example, in one embodiment, the orders obtained by the order module 118 may be based on a level of a given player character having a specific class, e.g., mage. In that embodiment, the orders obtained by the order module 118 may specify a first temporal sequence for applying the results in the pull outcome—e.g., any attribute increase type of results in a given pull outcome should be applied before any payout type of results in the given pull outcome) when the mage is at level 5 or below; and may specify a second temporal sequence for applying the results in the pull outcome—e.g., any attribute increase type of results in the given pull outcome should be applied after any payout type of results in the given pull outcome when the mage is at level 6 or above. In this way, the orders for applying the results in the given pull outcome may be deterministic such that the player may predict how the results in the given pull outcome may be applied based on relevant criteria.

Some examples of such criteria may include, without limitation, a level, class, race, one or more skills, one or more abilities, one or more items and/or any other aspects associated with one or more player characters; a condition in the slot game—e.g., achieving a winning combination of symbols to trigger a different order for applying the results for 5 slot turns; for every milestone amount of experience points achieved in the slot game, a new and different order for applying the results in a pull outcome may triggered; for every milestone amounts of virtual currencies or credits accumulated in the player account, a new and different order for applying the results may be triggered, and/or any other conditions; a state of the game space—e.g., to freeze a monster for a number of turns and during those turns, a different order for applying the results in the pull outcome may be used; for every milestone number of monsters killed in the game space, a new and different order for applying the results may be trigged; for every stage entered in the game space, a new and different order for applying the result may be trigged; breaking into a building to trigger a different order and/or any other game state; and/or any other criteria.

In some implementations, the order module 118 may be configured to obtain the orders for applying results in a pull outcome from a given player, e.g., via a graphical interface. In those implementations, the given player may be enabled to directly select specific order or orders for applying the results in a pull outcome; or may be enabled to select one or more aspects of the slot game and/or the game space that may affect the order(s) for applying results in a given pull outcome; and/or may be enabled to manipulate the orders for applying the results in the pull outcome in any other ways. In one embodiment, a graphical interface is implemented on a client computing platform associated with the given player such that the given player may select an order for applying the results in the pull outcome, e.g., an interface presenting a list of potential orders for aggregating the results and the player may select one or more orders from that list. In another embodiment, a graphical interface is implemented such that the player is facilitated to elect a difficulty level for the slot game (e.g., easy, medium, difficult, impossible, and/or any other difficulty level) and the difficulty level selected by the player may correspond to an order or orders for applying the results in a pull outcome. In some examples, the order(s) for applying the results may be for purchase by the player such that the player may spend virtual consideration (e.g., virtual currencies, real-world money, credits and/or any other values associated with the game space) to select an order for aggregating the results in a given pull outcome.

In some examples, the orders obtained by the order module 118 for a given player may be based on player character(s) or a configuration of the player characters. For example, orders for applying the results by result types may be based on level, class, race, skills, items, equipment, abilities and/or any other attributes associated with one or more player characters. For instance, if a player character is at below level 5 and is of a mage class, the order(s) obtained by the order module 118 for the given player may specify that payout type of results in a pull outcome should be applied first and before any other types of results in the pull outcome; and if a player character is at above level 5 and is of the mage class, the order(s) obtained by the order module 118 for the given player may specify that payout type of results in a pull outcome should be applied last and after any other types of results in the pull outcome. In some examples, the order(s) obtained by the order module 118 for the given player may be based on a configuration of player characters associated with the given player—e.g., a party. For example, if the player characters associated with the given player comprise a mage and fighter, a first order for applying the results in a given pull given outcome may be obtained by the order module 118 for the given player; if the player characters associated with the given player comprise a mage, fighter and a thief, a second order for applying the results in the given pull given outcome may be obtained by the order module 118 for the given player; if the player characters associated with the given player comprise a mage, fighter, a thief and a dwarf, a third order for applying the results in the given pull given outcome may be obtained by the order module 118 for the given player; and so on.

The aggregate result module 120 may be configured to aggregate the results determined by the result module 116 by applying the orders obtained by the order module 118. The result aggregation by the aggregate result module 120 may involve applying individual results in a pull outcome in the time sequence specified in accordance with an order or orders obtained by the order module 118. In some implementations, for the result aggregation, the aggregate result module 120 may apply an individual result directly in accordance with, for example a formula, programming rules, a specification and/or any other application rules associated with the individual results. For example, for applying a payout type of results, the aggregate result module may apply payout formulas associated with such results and determine amounts of payouts to be distributed to players. In some implementations, the aggregate result module 120 may apply the individual results by effectuating application of components within the individual results. For example, an individual gameplay type of results may include multiple gameplays for implementation in the game space associated with the slot game. In that example, the aggregate result module 120 may effectuate those gameplays by transmitting control inputs to, for example the game space module 122 for implementation of the gameplays in the game space.

In any case, the aggregate result module 120 may aggregate results in the pull outcome by applying an order or orders obtained by the order module 118. As described above, in some implementations, the order(s) obtained by the order module may specify a temporal sequence for applying different types of results in the pull outcome. FIGS. 7A-B illustrate examples of aggregating a set of results in a pull outcome by applying different orders. FIG. 7A illustrates one example of aggregating results shown in FIG. 6 by applying a first order. It will be described with references to FIG. 6. As shown in this example, a first order 702 may be obtained by the server 102, for example via order module 118 for aggregating the results 602 shown in FIG. 6. As also shown, player character information 704 may be obtained for aggregating the results 602. As described above, in some examples, such as in this example the order for aggregating the results 602 may be based on criteria such as the class, level, skill, and/or any other aspects regarding the player character. In this example as shown, the first order 702a may specify any payout type of results should be applied before any attribute increase type of results. Accordingly, as shown, in this example, the server 102, e.g., via the aggregate result module 120 applies results 1, 2, X in the that order since result 1 is of a payout type and results 2 and X are of an attribute increase type. As illustrated, in accordance such an order, the sever 102, e.g., via aggregate result module 120 applies result 1 first based on the payout formula associated with result 1 shown in FIG. 6 and determines the amount of the payout awarded by result 1 should be 600 coins by plugging the player character level (3) and lock picking skill level (2) in the formula as shown. As also shown, the sever 102, e.g., via aggregate result module 120 applies result 2 and X subsequently. As shown, the lock picking skill level and the overall level of the player character both increased due to the application of results 2 and X. However, the application of results 2 and x does not affect the application of result 1 since the application of result 1 has been made before the results 2 and X are applied. As shown, the server 102 in this example determines the amount of the payout awarded by result 1 should be 600 coins by plugging the player character level (3) and lock picking skill level (2) in the formula as shown. As also shown, the sever 102, e.g., via aggregate result module 120 applies result 2 and X subsequently. As shown, the lock picking skill level and the overall level of the player character both increased due to the application of results 2 and X. However, the application of results 2 and x does not affect the application of result 1 since the application of result 1 has been made before the results 2 and X are applied.

FIG. 7B illustrates one example of aggregating the results shown in FIG. 6 by applying a second order. As shown in this example, a second order 702b may be obtained by the server 102, for example via order module 118 for aggregating the results 602 shown in FIG. 6. As also shown, player character information 704 may be obtained for aggregating the results 602. In this example as shown, in contrast to the first order 702a shown in FIG. 7A, the second order 702b may specify any payout type of results should be applied after any attribute increase type of results. Accordingly, as shown, in this example, the server 102, e.g., via the aggregate result module 120 applies results 2, X, 1 in accordance with second order 702b since result 1 is of a payout type and results 2 and X are of an attribute increase type. As illustrated, in accordance second order 702b, the sever 102, e.g., via aggregate result module 120 applies results 2 and X first by applying the awarded 200 lock picking points to the player character (result 2), which increased the level of the player character's lock picking skill from level 2 to level 3; and applying the awarded 500 XP points to the player character (result X), which increased the overall level of the player character. Subsequent to the applications of results 2 and X, the server 102, e.g., via the aggregate result module 120 applies result 1 in accordance with the order 702b in this example. As shown, since the application of result 1 depends on applications of results and X as specified by the formula associated with result 1, the application of result 1 resulted in a bigger payout, i.e., 1200 coins to the player in comparison to the 600 coins payout determined in FIG. 7A. This illustrates aggregating the results in a pull outcome by different orders may lead to different awards (e.g., payouts) to the player.

Returning to FIG. 1, in some implementations, the server 102 may include a game space module 122 be configured to apply the slot game results determined by the result module 116 based on the orders obtained by the order module 118 for implementing instances of a game space associated with the slot game. In those implementations, based on the combination of symbols appearing on the active paylines associated with a player as determined by the payline module 116, the game space module 122 may be configured to determine states of the game space communicated (e.g., via textual data, visual data, object/position data, and/or other state information) from server 102 to client computing platforms 104 for presentation to users. A given game space state determined and transmitted to a given client computing platform 104 may correspond to a description, a representation, a view and/or any other suitable form for presenting the player characters via the given client computing platform 104 at a given point of time in the game space. The given game space state determined and transmitted to the given client computing platform 104 may correspond to a location or locations from which a scene in the game space takes place. Within such a scene, creatures, monsters, items, treasures, buildings and/or any other game space elements may occupy various positions in the location(s) corresponding to the scene. In some implementation, the given state of the game space may be presented in a slot game interface implemented on client computing platform 104, such as the slot game interface shown in FIG. 4.

Within the instance of the game space, players may participate in the game space through player characters to experience the game space. In some examples, the gameplays in the instance of the game space may involve, without limitation, exploring the game space, encountering and fighting the creatures, monsters, and/or any other game space elements, collecting and amassing virtual currencies, resources, treasures, real-world money and/or any other values, interacting with non-player characters, and/or any other types of gameplays.

The instance of the game space and/or the game that takes place therein may be persistent. That is, the game space may continue on whether or not individual players are currently logged in and/or participating in the game space. A player that logs out of the game space and then logs back in some time later may find the game space has been changed through the interactions of characters not controlled by the player with the game space during the time the player was logged out. These changes may include changes to the simulated physical space of the game space, changes in the player's inventory, changes in other users' inventories, changes experienced by characters not controlled by the player, and/or other changes.

The instance of the game space may comprise a simulated space that is accessible by users via clients (e.g., client computing platforms 104) that present the description, representation, views and/or any other forms of presentation of the game space to a user, for example in the slot game interface shown in FIG. 4. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the game space is determined by game space module 122 is not intended to be limiting. The game space module 122 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

The instance of the game space executed by the game space module 122 may comprise characters not associated with any player. As used herein, such characters in the instance of the game space are referred to as "non-player characters". Examples of non-player characters may include, without limitation, monsters, magic creatures, mercenaries, merchants, villagers, priests, and/or any other characters not associated with any player in the game space. Certain traits, attributes and/or characteristics may be manifested by, possessed by and/or otherwise associated with the non-player characters. As an illustration, the traits, attributes and/or characteristics associated with non-player characters may include level, size, origin, race, type, class, experience points (XP), vitality attributes (e.g., hit points, health, stamina, strength and/or any other vitality attributes), various abilities, skills and/or any other acquired acumens, attack powers (e.g., as satiated by type, action(s) enabled, recharge, reach, range, area, target, attack bonus, target defense and/or any other aspects that may be associated with attack powers), and/or other traits, attributes and/or characteristics associated with such characters. Such characteristics associated with non-player characters may be represented by natural numbers. For example, a monster may have 100 hit points, 50 attack power points, 2 units of attack range, and so on. Some non-player characters may be associated with virtual currencies, treasures, items (e.g., mystery boxes, equipment scrolls, and/or any other virtual items), resources, objects, real-world money, credits and/or any other values associated with the game space. For example, the monster described above may be associated with a coin bag consisting of 100 coins and a magic knife has 5 gem sockets. Such values associated with non-player characters may be collected by the players upon maturation of certain conditions. For examples, the bag of 100 coins and the magic knife associated with the monster and may be collected by the player once the hit points of the monster reaches 0.

Within the instance of game space executed by the game space module 122, player characters associated with the player of the slot game may interact with game space elements. For example, the player characters may encounter game space elements such as, without limitation, non-player characters including monsters, creatures and/or any other non-player characters, objects, buildings, virtual items, virtual containers (e.g., mystery boxes) and/or any other game space elements. For example, a given player character may encounter a group of monsters at a location within the game space, e.g., in a dungeon. Such an encounter may take place as directed by pull outcomes of slot game described herein. For example, a combination of symbols appearing on an active payline in a pull outcome may represent a group of monsters (two or more) in the game space; and the combination of the symbols may result in the encounter between the player character and the group of monsters in the game space. In some examples, such combat encounters may in turn result in one or more combative actions between the player characters and the group of monsters.

However, not all encounters between the player characters and the non-player characters may result in combat actions described above. In some examples, the encounters between the player characters and certain non-player characters may result in non-combat actions which may trigger, for example a quest challenge, a skill challenge and/or any other types of challenges. For example, a given player character may encounter a sage in the game space (e.g., as directed by a combination of symbols appearing on an active payline graphically representing the mage) and the sage may challenge the player character to collect 5000 coins in the next hour for a rare virtual item in the game space. Such non-combative encounters typically result in awards. The awards may include virtual currencies, items, resources, objects, real-world money, credits and/or any other values associated with the game space.

In some implementations, the game space module 122 may be configured to implement the game space by determining a state of the game space at a given time. This may involve implementing results of encounters, quests, skill challenges, treasure collection and/or any other gameplays in the game space. The state change of the game space determined by the game space module 122 may include state change(s) of one or more player characters in the game space. For example, a state change of a given player character may be based on a result of an action between the given player character and a monster during a combat encounter in the game space. The state change of the given player character may include adjustments of one or more attributes associated with the player characters. By way of non-limiting example, the state change of the player character during the combat encounter may include a change in hit points, strength, stamina, virtual items and/or any other attributes associated with the given player character (e.g., reduced) as a result or results of the combat encounters.

The state change(s) determined by the game space module 122 may include state changes of non-player characters, buildings, objects, and/or any other elements in the game space not associated with players. For example, the combat encounter between the given player character and the group of monsters described above may result in reduction in certain attributes associate with the monsters, such as hit points of the monsters and/or any other attributes associated with the monsters. For instance, the game space module may determine that the player character incurred 40 hit point loss on the monsters and the monsters' hit points thus are reduced by 40. In another example, integrity, e.g., also measured by hit points of a building the game space may be reduced by an attack action by the given player character in the game space: for example, the given player character threw flames at the building and reduces hit points of the building. In various implementations, the game space elements (including player characters) may be eliminated from the game space when the game space module 122 determines the state change of these game space elements cause some attributes associated with these game space elements to reach 0 or below. For example, the player character may be eliminated (e.g., killed) in the game space if the hit points associated with the player character reaches 0 or below; a monster may be eliminated from the game space if the hit points associated with the monster reaches 0 or blow; and a building may be eliminated (e.g., demolished or removed) from the game space if the hit points associated with the building reach 0 or below, and so on. In some examples, the game space module 122 may increase or decrease balances of, for example virtual currencies, credit, real world money and/or any other values associated with the players based on the state change(s) determined by the game space module 122. For instance, a given player character may pick up treasures dropped by a monster after the monster is killed during a combat encounter between the player character and the monster. In that instance, the treasures (e.g., virtual currencies like gems) may be added to an account associated with the player.

Within the instance of the game space executed by the game space module 122, virtual currencies, items, resources, objects, real-world money, credits and/or any other values associated with the game space may be provided available in various ways. For example, a monster may be associated with such values such that when the monster is killed in a combat encounter by a play character, the values associated with the monster (e.g., a bag of coins) may be collected by the play character. In some examples, such values may be available in the game space simply for the player character to collect. That is, in those examples, such values may be encountered by the player character, e.g., via symbols of the slot games, and result in being collected by the player character. In some examples, to collect the values, requirements, such as skill, ability, level, experience points, and/or any other requirements may be imposed on the player character. For example, a mystery box collected by the player after a slot play may require a level 2 lock picking skill by a player character associated with the player. In that example, such a mystery box may not be opened until the player character acquires the level 2 lock picking skill.

The game space module 122 may be configured to apply the slot game results determined by the result module 116 based on the orders obtained by the order module for implementing instances of a game space. For example, a given result in a given pull outcome may comprise a combination of symbols, which may represent various game space elements, game actions, virtual objects, values and/or any other components associated with the game space. Such a result in the given pull outcome may trigger implementation of one or more gameplays in connection with the winning combination of symbols.

In some implementations, one or more symbol-gameplay table(s) may be used to specify associations between combinations of symbols appearing on active paylines in the pull outcomes and corresponding gameplays that may be implemented in the game space by the game space module 122. In some examples, the combination of symbols in the pull outcomes may represent game space elements, such as non-player characters including monsters, creatures, and/or any other non-player characters, buildings, virtual items, virtual containers (e.g., mystery boxes), objects, and/or any other game space elements. These game space elements may be associated with various attributes in the game space, such as, but not limited to, health, hit points, defense, attack power, special abilities, armor class, virtual values associated with the game space elements (e.g., "loot"), and/or any other character attributes.

For example, the winning combination of symbols may represent non-player characters such as, without limitation, creatures, monsters, AI enemies, and/or any other non-player characters in the game space, and may trigger an encounter between the player character and the non-player characters represented by the winning combination of symbols. In another example, the winning combination of symbols may represent actions in the game space such as, without limitation, dealing damages to one or more specific targets, performing one or more maneuvers in the game space, entering a building, attacking a building, and/or any other game actions, and may trigger one or more gameplays involving the game actions represented by the winning combination of symbols in the game space. In another example, the winning combination of symbols may represent virtual currencies, items, resources, virtual containers (e.g., mystery boxes), objects, real-world money, credits and/or any other values associated with the game space, and trigger the player character to collect these values represented by the winning combination of symbols in the game space.

Figure 8:
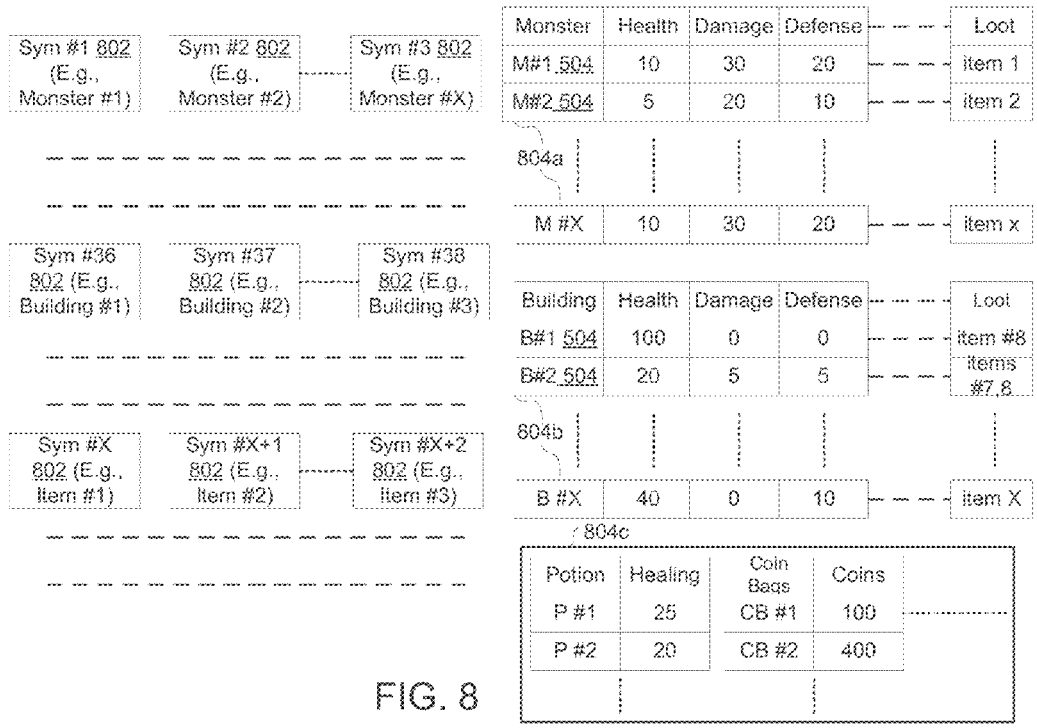
FIG. 8 illustrates various examples of the symbols shown in FIGS. 4-5.
Figure 9:
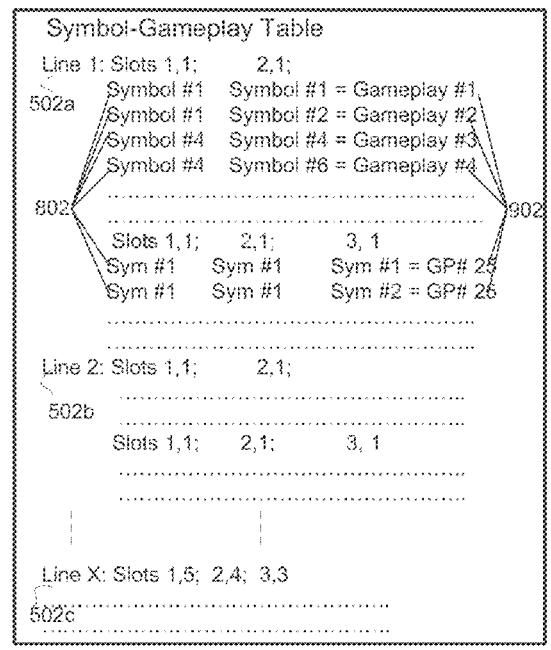
FIG. 9 illustrates various examples of gameplays that may be implemented in a game space as results of the slot game shown in FIG. 4.

FIGS. 8-9 illustrate some examples of slot game results that may trigger gameplays in a game space. FIG. 8 illustrates various examples of the symbols shown in FIGS. 4-5. It will be described with references to FIGS. 4-5. As shown in FIG. 6, symbols 802 may be associated with the slot game facilitated by the slot game interface shown in FIG. 4. As illustrated, a given symbol 802 may represent a game space element, such as a non-player character including monster, creature, and/or any other non-player character, a building, a virtual item, an object, and/or any other game space elements. Such representation may include still art graphics, animation, video, 2D images, 3D images, and/or any other types of representation. The game space elements represented by the symbols 802 may be associated with attributes in the game space as described herein. These attributes may be determined and/or specified by players, provider, administrator, moderator, and/or any other entities related to the game space. FIG. 8 illustrates one example for specifying the attributes of the game space elements representing the symbols 802 using tables 804.

In this example, a table 802*a* is illustrated for specifying various attributes associated with various monsters representing some symbols 802. As illustrated, the monsters representing symbols 802 may be associated with attributes like health, damage, defense, loot and/or any other attributes. The loot attribute or similar attributes may be used to specify virtual currencies, items, resources, objects, real-world money, credits and/or any other values associated with the monsters such that these values may be provided (e.g. dropped by the monster) to players after the players defeat the monsters.

In this example, a table 804*b* is illustrated for specifying various attributes associated with various buildings in the game space representing some symbols 802. The buildings may include rooms, cities, cabins, caves, castles, and/or any other open or closed structures within the game space. As illustrated, the buildings representing symbols 802 may be associated with attributes like health, damage, defense, loot and/or any other attributes. The loot attribute or similar attributes may be used to specify virtual currencies, items, resources, objects, real-world money, credits and/or any other values associated with the buildings such that these values may be provided (e.g. available for collection inside the buildings) to players after the players break defenses (e.g., reduce building health 0 or below, defeat monsters guarding the buildings) of the buildings.

In this example, tables 804*c* are illustrated for specifying various attributes associated with various virtual items in the game space representing some symbols 504. As shown, items representing some symbols 802 such as healing potions, coin bags, mystery boxes, scrolls through which new skills may be acquired, wisdom pills, and/or any other items may be associated with relevant attributes. For example, different healing potions may be associated with numbers of hit points they can help player character restore; different coin bags may be associated with different amounts of coins provided through the coin bags.

FIG. 9 illustrates various examples of gameplays that may be implemented in a game space as results of the slot game shown in FIG. 4. As shown in FIG. 9, in some implementations, symbol-gameplay table 900 may be used to for implementing gameplays in the game space based on results 602 in a pull outcome of the slot game. As shown, the symbol-gameplay table 900 may specify associations between combinations of symbols 802 appearing on active paylines 804 and corresponding gameplays 902. As illustrated, in this example, a combination of a first symbol #1 appearing on slot 1,1 and a second symbol #1 appearing on slot 2,1 on active payline 502a may correspond to a gameplay #1 in the game space such that achieving this combination of symbols #1 in the pull outcome may effectuate gameplay #1 in the game space. In some examples, this combination of symbols #1 may represent a group of monsters in the game space, and the corresponding gameplay #1 may involve a combat encounter between one or more player characters associated with a player in the game space. In those examples, in accordance with the symbol-gameplay table shown, achieving this combination of symbols #1 in the slot game by a player may effectuate a combat encounter between player character and the group of monsters represented by the combination of symbols #1 in the game space. It should be appreciated that the combination of symbols 802 may not necessarily comprise matching symbols (e.g., same symbols across a payline 502). As shown in this example, some combinations of symbols may include different symbols: for instance, as illustrated a combination of symbols 802 may include symbol #1 appearing on slot 1,1, and symbol #2 appearing on slot 1,2 on payline 502a, wherein the symbols #1 and #2 are distinct and different. For example such a combination of different symbols may represent a group of different kinds of monsters (e.g., a goblin represented by symbol #1 and a ghoul represented by symbol #2), specific action on a target (e.g., a goblin represented by symbol #1 and a damage sign represented by symbol #2 indicating an amount of damage is to be dealt to the goblin), a monster having an item in its possession (e.g., symbol #1 represents a goblin and symbol #2 represents a silver bag of coins such that symbols #1 and 2 in combination represent the goblin carries a silver bag of coins), and/or any other configurations of game space elements however desired.

Also illustrated in FIG. 9 are a set of results 602 in a given pull outcome that may trigger corresponding gameplays 902 to be implemented in the game space. The results 602 may be determined by the server 102, e.g., via the result module 116 as described herein. As shown, in this example, result #1 in the given pull outcome triggers an implementation of gameplay #1 in the game space, e.g., combat with a monster in the game space; result #2 in the given pull outcome triggers an implementation of gameplay #25 in the game space, e.g., pick up a mystery box and collect contents of the mystery box in the game space; and result #x in the given pull outcome triggers an implementation of gameplay #X in the game space, e.g., pickup a bottle, and drink contents of the bottle. As will be illustrated in FIGS. 10A-B, the server 102, e.g., via the game space module 122 may implement these gameplays by applying orders, e.g., as obtained by the order module 118 described herein.

Figure 10A:
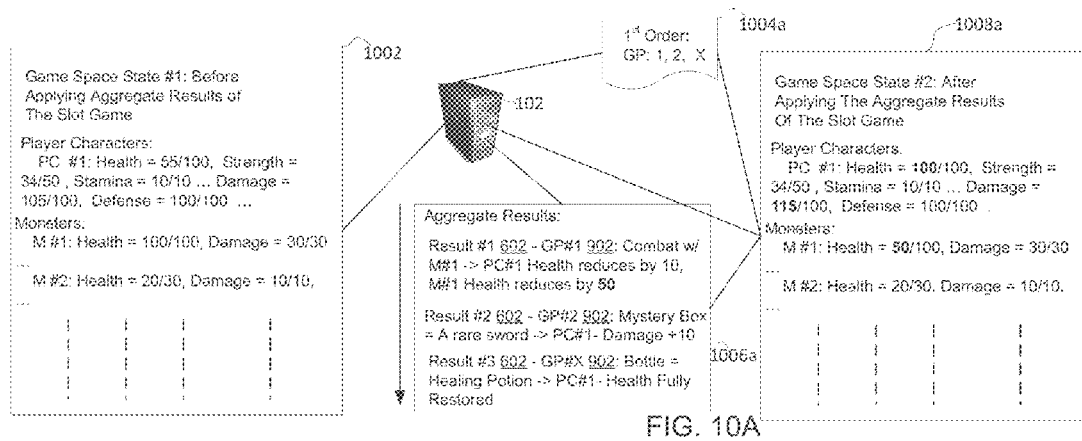
FIG. 10A illustrates one example of implementing gameplays corresponding to results shown in FIG. 9 in a game space associated with the slot game by applying a first order.

FIG. 10A illustrates one example of implementing gameplays corresponding to results shown in FIG. 9 in a game space associated with the slot game by applying a first order. In this example, as shown, a game state information table 1002 reflects a state of the game space before aggregating the results 602. As shown, for aggregating the results 602, the server 102, e.g., via the order module 118 may obtain a first order 1004a, which may be based on one or more factors, such as, but not limited to, one or more attributes of the player character(s) associated with the player, a difficulty level associated with the game space and/or the slot game, a specification by the player specifying the order, and/or any other factors. For instance, the order 1004a may be based on the level, class, race, one or more skills, one or more virtual items, and/or any other attributes of the player character (s): e.g., the order 1004a may be based on that a given play character is at a certain level, has a class, has acquired certain skills, has achieved certain experience level, and/or any other factors about the given player character in the game space. In another instance, the order 1004a may be based on a difficulty level (e.g., easy) selected by the player for the game space and/or the slot game. In still another instance, the order 1004a may be based on an order specified by the player through a graphical player interface (e.g., the player in that instance may have specified implementing the combat type of gameplays before applying object collection type of gameplays).

In any case, as shown in FIG. 10A, the order 1004a in this example, specifies that result 1, 2 and X should be aggregated by that order, i.e., the first order temporally. FIG. 10A illustrates that based on the first order 1004a in this example, the server 102 aggregates the results 602 for implementation in the game space, e.g., via the aggregate result module 120. As shown, for arriving at the aggregated results 1006a, the server 102 first applies result #1 in accordance with the first order 1004a. In this example, the application of result #1 involves determining a result of the gameplay #1 combat between the player character and monster #1 (e.g., represented by the winning combination of symbols associated with result #1 as shown in FIG. 8). As illustrated, based on the state of the player character (e.g., its attack power, attack range, and/or any other factors), the state of the monster #1 (e.g., its defense, attack power, and/or any other factors), and/or any other statistics relevant to the determination of the result of the combat between the player character and monster #1, the server 102 may determine the result for such a combat as illustrated. Subsequent to the application of result #1, the server 102 may then apply results 2 and X, which involve determining results for gameplay #25 and gameplay #X respectfully as illustrated. As shown, the application of results 25 and X do not affect the application of result 1 in this example, since result 1 has been applied by server 102 before applying results 2 and X. The server 102, e.g., via the game space module 122 may implement game plays #1, 25 and X corresponding to the results 602 in the pull outcome in the game space. The game state information table 1008a illustrates the game state after the implementation of those gameplays in the game space.

Figure 10B:
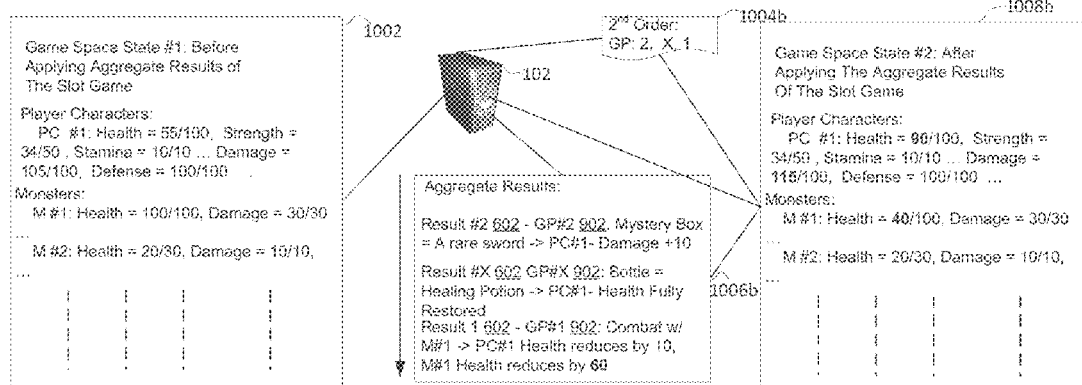
FIG. 10B illustrates one example of implementing gameplays corresponding to results shown in FIG. 9 in a game space associated with the slot game by applying a second order.

FIG. 10B illustrates one example of implementing gameplays corresponding to results shown in FIG. 9 in a game space associated with the slot game by applying a second order. As shown in this example, the server 102 may obtain, e.g., via the order module 118 a second order 1004b, different from the first order 1004a shown in FIG. 10a. In this example, the order 1004b specifies that gameplays corresponding to the results 602 should be aggregated by the second order 1004b such that results 602 #2, #X and #1 should be applied in that temporal sequence. As illustrated, in accordance with the order 1004b, the server 102, e.g., via the aggregate result module 120 applies results #2 and #X first. As also illustrated, the server 102 in this example then applies result #1 by determining the result of the combat between the player character and monster #1 in the game space. As illustrated, in comparison with aggregate results 1006a shown in FIG. 10A, the aggregate results 1006b are different even though the same results are applied in both cases. This is because the orders for applying these results are different. Such a difference is also reflected in the game state information 1008*b* shown in FIG. 10B.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor may include a plurality of processing units. These processing units may be physically located within the same device, or processor 108 may represent processing functionality of a plurality of devices operating in coordination. The processor 108 may be configured to execute modules 112, 114, 116, 118, 120, 122. Processor 108 may be configured to execute modules 112, 114, 116, 118, 120, 122 by software; hardware; firmware; some combination of software, hardware, and/or firmware; and/or other mechanisms for configuring processing capabilities on processor 108.

It should be appreciated that although modules 112, 114, 116, 118, 120, 122 are illustrated in FIG. 1 as being co-located within a single processing unit, in implementations in which processor 108 includes multiple processing units, one or more of modules 112, 114, 116, 118, 120, 122 may be located remotely from the other modules. The description of the functionality provided by the different modules 112, 114, 116, 118, 120, 122 described below is for illustrative purposes, and is not intended to be limiting, as any of modules 112, 114, 116, 118, 120, 122 may provide more or less functionality than is described. For example, one or more of modules 112, 114, 116, 118, 120, 122 may be eliminated, and some or all of its functionality may be provided by other ones of modules 112, 114, 116, 118, 120, 122. As another example, processor may be configured to execute one or more additional modules that may perform some or all of the functionality attributed below to one of modules 112, 114, 116, 118, 120, 122.

Figure 11:
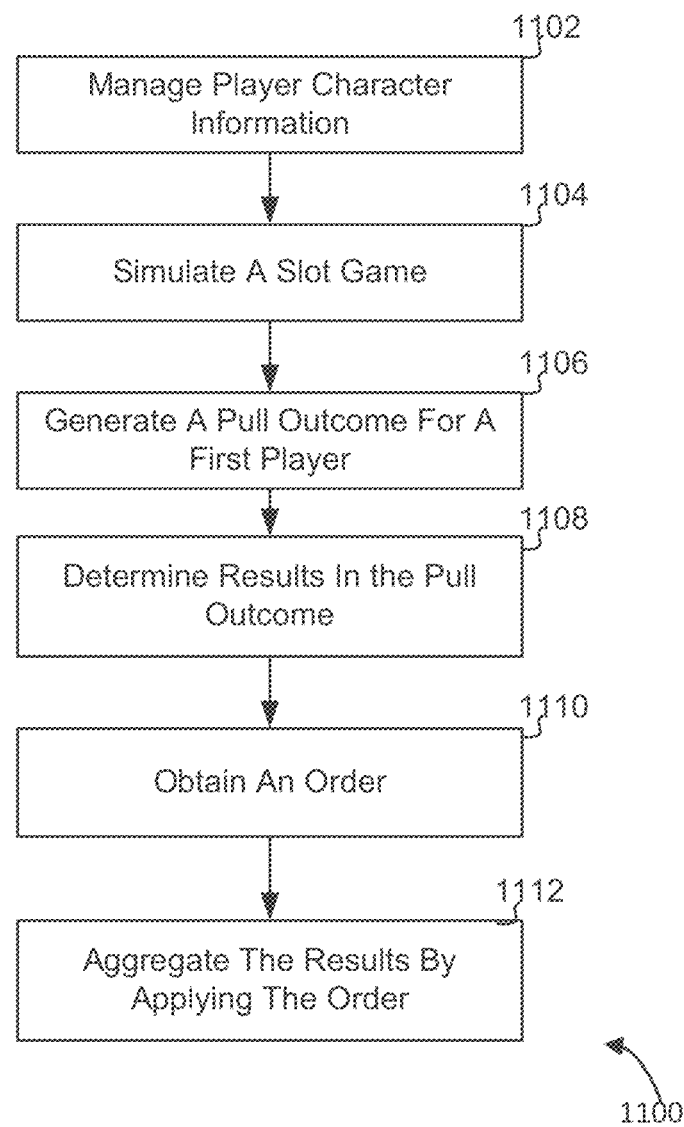
FIG. 11 illustrates one exemplary method 1100 for aggregating results in a slot game in accordance with the disclosure.

FIG. 11 illustrates one exemplary method 1100 for aggregating results in a slot game. The operations of method 1100 presented below are intended to be illustrative. In some embodiments, method 1100 may be accomplished with one or more additional operations not described, and/or without one or more of the operations discussed. Additionally, the order in which the operations of method 1100 are illustrated in FIG. 11A and described below is not intended to be limiting.

In some embodiments, method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At an operation 1102, player character information regarding player characters associated with players in a slot game may be managed. The player character information managed in operation 1102 may indicate, without limitation, name, level, race, class, size, age, gender, height, weight, alignment, deity, abilities, skills, health, attack, defense, sense, magic spells, language, movement, speed, and/or any other attributes associated with the player characters. The player character information managed in operation 1102 may include player character information regarding a first player character associated with a first player. In some implementations, operation may be performed by a player character module the same as or similar to player character module 112 (shown in FIG. 1 and described herein).

At an operation 1104, a slot game may be simulated. In some implementations, operation 1104 may be performed by a slot game module the same as or similar to slot game module 114 (shown in FIG. 1 and described herein).

At an operation 1106, a pull outcome may be generated for a first player in the slot game simulated in operation 1104. The pull outcome generated in operation 1106 may include stochastic configuration of symbols representing game space elements such as non-player characters, virtual items, virtual containers (e.g., mystery boxes), buildings, and/or any other game space elements. In some implementations, operation may be performed by a slot game module the same as or similar to slot game module 114 (shown in FIG. 1 and described herein).

At an operation 1108, results in the pull outcome generated in operation 1106 may be determined. The results determined in operation 1108 may include various types, such as, without limitation, attribute change type of results wherein the results may effectuate modification one or more attributes of one or more player characters, payout type of results wherein the results may effectuate distribution of payouts to the player, slot game adjustment type of results wherein the result may trigger various aspect adjustment of the slot game such as, but not limited to, modification of the modifier, increasing the number of active paylines, improvements to odds (real or perceived) and/or any other types of slot game aspect adjustment, bonus game type of results wherein the results may trigger one or more bonus games, free pulls, a jackpot won, and/or any other bonuses for the player, gameplay type of results wherein the results may determine specific gameplays to be implemented in a game space associated with the slot game and/or outcomes of such gameplays (e.g., damage incurred or received, movements triggered, objects collected and/or any other outcomes), and/or any other types of results in a pull outcome. In some implementations, operation 1108 may be performed by a result module the same as or similar to result module 116 (shown in FIG. 1 and described herein).

At an operation 1110, an order for aggregating the results determined in operation 1108 may be obtained. The order obtained in operation 1110 may specify a temporal sequence by which the results determined in operation 1108 may be applied. As such, the order obtained in operation 1110 may dictate timing by which the results determined in operation 1108 may be applied. In some implementations, operation may be performed by an order module the same as or similar to order module 118 (shown in FIG. 1 and described herein).

At an operation 1112, the results determined in operation 1108 may be aggregated by applying the order obtained in operation 1110. In some implementations, operation 1112 may be performed by an aggregate result module the same as or similar to the aggregate result module 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for aggregating results in a slot game, the system comprising
   one or more processors configured by machine-readable instructions to:
      manage player character information indicating states of player characters associated with players of the slot game such that the player character information includes first player character information indicating a state of a first player character associated with a first player of the slot game and second player character information indicating a state of a second player character associated with a second player of the slot game;
      simulate the slot game for participation by the players and to generate, for the players, pull outcomes of the slot game such that a first pull outcome for an individual pull is generated for the first player wherein the first pull outcome includes a first payline and a second payline;
      determine, for the players, results of the slot game from the pull outcomes generated by the slot game such that, a first group of results from the first pull outcome is determined for the first player, the first group of results including a first result determined from a first combination of symbols in the first payline and a second result determined from a second combination of symbols in the second payline that both impact the first player character;
      obtain orders for applying the results determined such that a first order for applying the first result of the first payline and the second result of the second payline is obtained; and
      aggregate the slot game results determined by applying the orders obtained, wherein the first result of the first payline and the second result of the second payline are aggregated according to the first order to determine a first turn result;
      wherein the orders are based on the player character information for individual players for which the slot game results are aggregated, such that responsive to the first result and the second result being aggregated for the first player, the first result and the second result are aggregated by applying the first order based on the first player character information, and responsive to the first result and the second result being aggregated for the second player, the first result and the second result are aggregated according to a second order based on the second player character information.

2. The system of claim 1, wherein the one or more processors are further configured by machine-readable instructions such that the first group of results includes the second result indicating an amount of payouts to be distributed to the first player, wherein application of the first result affects the second result.

3. The system of claim 2, wherein the one or more processors are further configured by machine-readable instructions such that the first order specifies that the first result is applied before the second result is applied.

4. The system of claim 2, wherein the one or more processors are further configured by machine-readable instructions such that the first order specifies that the second result is applied before the first result is applied.

5. The system of claim 1, wherein the one or more processors are further configured by machine-readable instructions to apply the slot game results determined based on the orders obtained for implementing instances of a game space such that the game space applies the first group of results based on the first order for implementing of an instance of the game space.

6. The system of claim 5, wherein the one or more processors are further
configured by machine-readable instructions such that:
the first group of results includes the second result, wherein the application of the second result affects the application of the first result in the game space; and
the first order specifies that the second result is applied before the first result is applied for implementation of the instance of the game space.

7. The system of claim 6, wherein the second result modifies the state of the first player character.

8. The system of claim 1, wherein the one or more processors are further configured by machine-readable instructions such that the first result includes a implementation of a first gameplay in the game space, the first gameplay including one or more of a combat action, an action that picks up one or more virtual items, an action that collects contents of the virtual items, an action that uses the virtual items, an action that directs a movement of the first player character in the game space, and a challenge to the first player character in the game space.

9. The system of claim 1, wherein the one or more processors are further configured by machine-readable instructions to obtain the orders for applying the results determined from the players such that the first order is obtained from the first player.

10. A method for aggregating results in a slot game, the method being implemented in one or more physical processors configured by machine-readable instructions, the method comprising
managing player character information indicating states of player characters associated with players of the slot game such that the player character information includes first player character information indicating a state of a first player character associated with a first player of the slot game and second player character information indicating a state of a second player character associated with a second player of the slot game;
simulating the slot game for participation by the players and generating, for the players, pull outcomes of the slot game such that a first pull outcome for an individual pull is generated for the first player wherein the first pull outcome includes a first payline and a second payline;
determining, for the players, results of the slot game from the pull outcomes generated by the slot game such that a first group of results from the first pull outcome is determined for the first player, the first group of results including a first result determined from a first combination of symbols in the first payline and a second result determined from a second combination of symbols in the second payline that both impact the first player character;
obtaining orders for applying the results determined such that a first order for applying the first result of the first payline and the second result of the second payline is obtained; and
aggregating the determined slot game results by applying the orders obtained, wherein the first result of the first payline and the second result of the second payline are aggregated according to the first order to determine a first turn result;
wherein the orders are based on the player character information for individual players for which the slot game results are aggregated, such that responsive to the first result and the second result being aggregated for the first player, the first result and the second result are aggregated by applying the first order based on the first player character information, and responsive to the first result and the second result being aggregated for the second player, the first result and the second result are aggregated according to a second order based on the second player character information.

11. The method of claim 10, wherein the first group of results includes the second result indicating an amount of payouts to be distributed to the first player, wherein application of the first result affects the second result.

12. The method of claim 10, wherein the first order specifies that the first result is applied before the second result is applied.

13. The method of claim 10, wherein the first order specifies that the second result is applied before the first result is applied.

14. The method of claim 10, further comprising applying the determined slot game results based on the obtained orders for implementing instances of a game space such that applying the first group of results based on the first order for implementing of an instance of the game space.

15. The method of claim 14, wherein
the first group of results includes the second result, wherein the application of the second result affects the application of the first result in the game space; and
the first order specifies that the second result is applied before the first result is applied for implementation of the instance of the game space.

16. The method of claim 15, wherein the second result modifies the state of the first player character.

17. The method of claim 10, wherein the first result includes a implementation of a first gameplay in the game space, the first gameplay including one or more of a combat action, an action that picks up one or more virtual items, an action that collects contents of the virtual items, an action that uses the virtual items, an action that directs a movement of the first player character in the game space, and a challenge to the first player character in the game space.

18. The method of claim 10, wherein the orders for applying the determined results is obtained from the players such that the first order is obtained from the first player.

* * * * *